US006425708B1

United States Patent
Siegfriedsen

(10) Patent No.: US 6,425,708 B1
(45) Date of Patent: Jul. 30, 2002

(54) METHOD FOR LAYING ELECTRICAL CABLES FROM A FIRST OFFSHORE WIND POWER PLANT TO A SECOND OFFSHORE WIND POWER PLANT

(75) Inventor: Sonke Siegfriedsen, Friedrichstadt (DE)

(73) Assignee: Aerodyn Engineering GmbH, Rendsburg (DE)

(*) Notice: Subject to any disclaimer, the term of this patent is extended or adjusted under 35 U.S.C. 154(b) by 0 days.

(21) Appl. No.: 09/868,970
(22) PCT Filed: Dec. 10, 1999
(86) PCT No.: PCT/DE99/03945
§ 371 (c)(1), (2), (4) Date: Jun. 22, 2001
(87) PCT Pub. No.: WO00/39903
PCT Pub. Date: Jul. 6, 2000

(30) Foreign Application Priority Data

Dec. 24, 1998 (DE) .......................... 198 60 211

(51) Int. Cl.⁷ ................................................ F03D 11/00
(52) U.S. Cl. .................... 405/154.1; 405/169; 405/158; 416/197; 416/196 A; 416/132 B
(58) Field of Search .............. 405/154.1, 169, 405/158; 290/44, 55; 416/132 B, 196 A, 197; 60/641.12

(56) References Cited

U.S. PATENT DOCUMENTS 3,512,367 A * 5/1970 McLallen, Jr. ............ 405/168.3
4,228,399 A * 10/1980 Rizzo et al. ................. 324/365
4,309,006 A * 1/1982 Biscomb ................. 244/153 R
4,355,513 A * 10/1982 Girden ........................ 417/108
4,423,333 A * 12/1983 Rossman ..................... 290/44
4,492,875 A * 1/1985 Rowe ........................... 290/44
4,565,929 A * 1/1986 Baskin et al. ......... 174/DIG. 15
4,707,041 A * 11/1987 Kovit et al. ................. 439/131
5,299,913 A * 4/1994 Heidelberg ................... 290/55
5,971,665 A * 10/1999 Hughes ....................... 405/159

FOREIGN PATENT DOCUMENTS

DE 2922715 A * 4/1981 ........... E02B/17/00
KR WO 98/26177 * 6/1998

* cited by examiner

Primary Examiner—Heather Shackelford
Assistant Examiner—Katherine Mitchell
(74) Attorney, Agent, or Firm—Larson & Larson, P.A.; James E. Larson

(57) ABSTRACT

A method for laying electrical cables from a first offshore wind power plant to a second offshore wind power plant. The method comprises placing the cable to be laid in the tower or the foundation of the first offshore wind power plant before the plant is erected, erection of the first offshore wind power plant, taking a tow line from one wind power plant to the other wind power plant, and drawing the leading end of the cable from the first wind power plant to the second wind power plant while releasing the cable from the tower or the foundation component of the first wind power plant.

20 Claims, 3 Drawing Sheets

METHOD FOR LAYING ELECTRICAL CABLES FROM A FIRST OFFSHORE WIND POWER PLANT TO A SECOND OFFSHORE WIND POWER PLANT

PRIOR APPLICATIONS

This application is a §371 U.S. National Phase application which bases priority on International Application No. PCT/DE99/03945, filed Dec. 10, 1999, which in turn bases priority on German Application No. DE 198 60 211.1, filed Dec. 24, 1998.

BACKGROUND OF THE INVENTION

1. Field of Invention

The invention relates to a method for laying electric cables from a first to a second offshore wind power plant.

2. Description of the Prior Art

Such a laying operation in particular causes problems if a wind power farm is set up with a plurality of individual plants, and optionally, also one or more collecting points for the electrical connection.

The laying of electric cables between several offshore wind power plants, which are more particularly set up in numerous adjoining installations if sufficient space is available, is complicated and costly.

For every comparatively short laying distance for a cable, the latter must be cut to length from a supply and connected at its two end points. The laying of cables between offshore plants at sea has hitherto taken place through the use of large cable laying ships, which are loaded with the necessary power lines and have to be maneuvered close to the comparatively sensitive towers of the wind power plants. Even if, in addition, smaller boats and divers are used, it is still necessary for the cable in a complicated and time-consuming manner to be threaded into the first tower, preferably in the vicinity of the ocean floor, followed by connection, laying to the next plant, the large ship having to be maneuvered, cut to length, and then using a diver, is introduced into the bottom of the second tower of a wind power plant.

As a result of the expensive ship operating times and the large number of personnel involved, such a complicated laying represents a very considerable cost factor, which comes close to the actual tower assembly costs.

The problem of the invention is to provide a method for laying cables which reduces effort and costs to a significant extent.

SUMMARY OF THE INVENTION

According to the invention this problem is solved by a method having the features of the main claim. The subclaims provide advantageous embodiments.

Advantageously, the cable to be laid is already installed in the tower or foundation part of each wind power plant to its erection, and this can take place on land in an assembly bay or the like, or can take place without difficulty together with the final assembly and prior to tower erection. Each plant then contains the necessary cable type and length required for connecting it to the next plant or a collecting point. If several connections are desired, this can be implemented without difficulty.

Transportation of the cable as an integral component of the tower then causes no problem, and it is available in the correct length at the correct location without there being any additional logistical costs.

Thus, on erecting any wind power plant, the cable is at the correct location and can, but need not be, electrically connected by one end, because if the cable end is in the vicinity of the electrical connection, this does not represent a significant problem. After transporting a tow line to the target wind power plant, a second free cable end can be simply drawn up to it without a boat being required, other than for bringing out the tow line.

In this way, the plants are electrically interconnected to a collecting point.

Advantageously, with a guide pulley provided at a bringing out opening, the cable can be drawn out without damage from the tower of the particular wind power plant without an operator having to be present at this location. Any twisting of the cable can be avoided in that it is correspondingly laid, or in that a drum is placed in a rotary manner in the wind power plant tower from which the cable can be unwound.

During the transfer of the cable to the target wind power plant, the cable end can be raised with a float so that frictional drag on the ocean floor and the risk of jamming or locking on any obstacles are avoided. It is also possible for there to be numerous floats on the cable, which raises the latter from the ocean bed. It is subsequently possible to cut off the lines, or the floats can be flooded to enable the cable to sink to the bed.

DESCRIPTION OF THE DRAWINGS

Further advantages and features of the invention can be gathered from the following description of a preferred embodiment with reference to the attached drawings, wherein.

DETAILED DESCRIPTION OF THE PREFERRED EMBODIMENT

Figure 1:
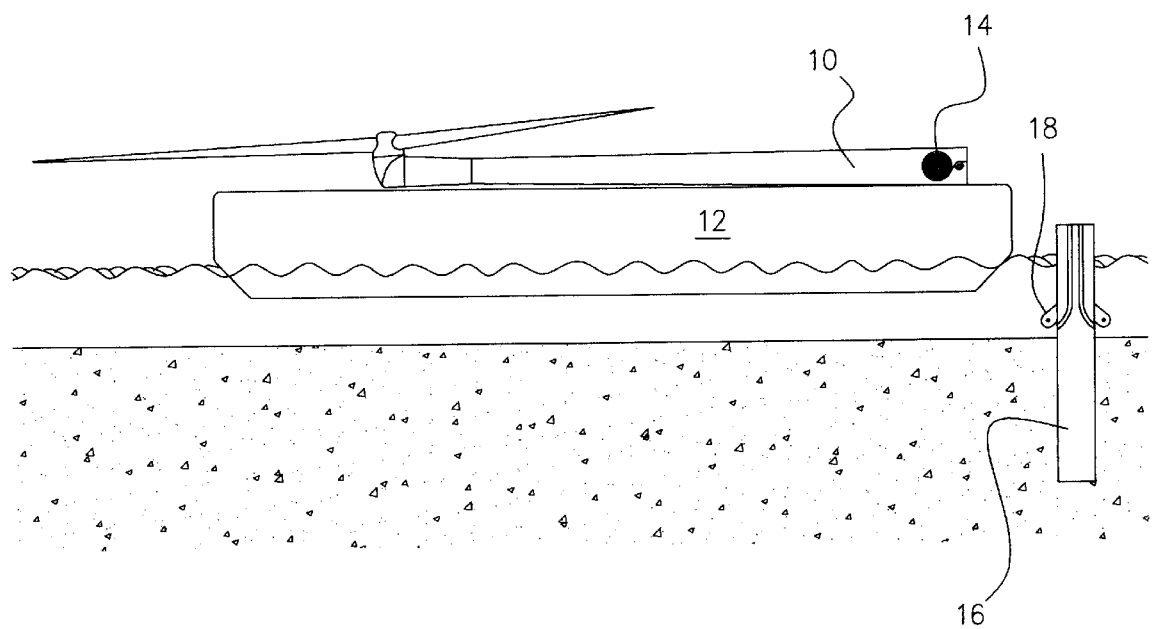
FIG. 1 is a diagrammatic representation of the erection of the first offshore wind power plant, the tower being shown in a horizontal position on a ship.

The method for laying electric cables, particularly within an offshore wind power farm between a plurality of wind power plants shown in exemplified manner in the drawings, proposes that the cable 14 to be laid is introduced into the foundation part 16 or into the tower of the first wind power plant 10 prior to the erection of the latter, and this advantageously takes place on land. Thus, in a single operation, both the tower and the cable can be brought to the erection location and there is no need for the otherwise necessary maneuvering of a large cable laying ship at, firstly, the first wind power plant to be erected, and then, at the second wind power plant, which can, in particular, be subject to damage through the ship in high seas.

Figure 2:
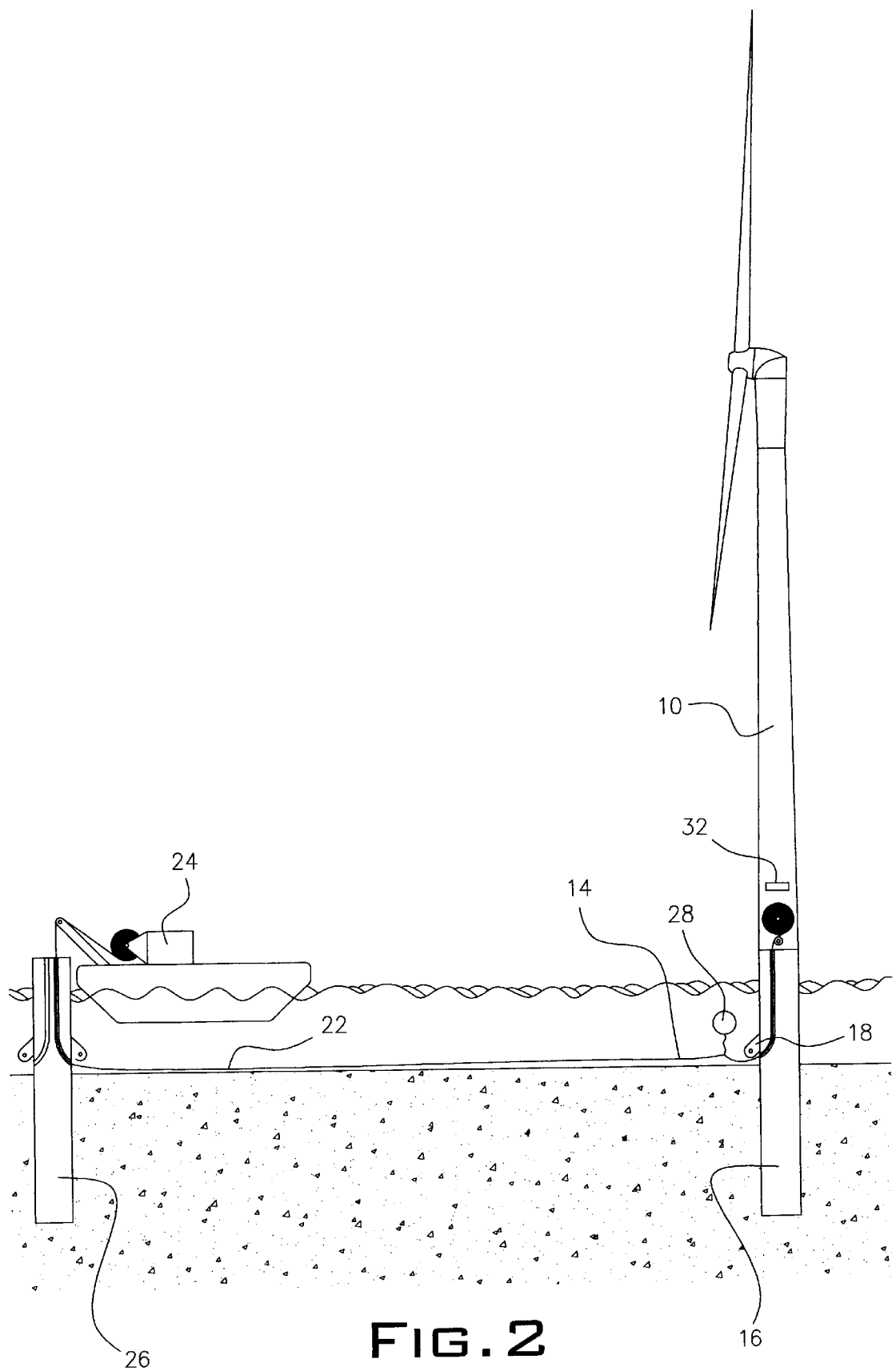
FIG. 2 is a diagrammatic representation of the pulling of the electric cable from a first wind power plant and the foundation part of a second wind power plant.

As can be gathered from FIG. 2, it is also possible without significant cost by means of a winch 24, which can be located either on the foundation part 26 of the second wind power plant 20 or on a small work boat, to wind on a previously brought out tow line 22 so that the cable 14, which is advantageously kept away from the ocean floor by a float 28 at its end, is drawn into the second wind power plant 20 or its foundation part 26. The tower of the second wind power plant 20 can already be completed, or as shown in FIG. 2, this only applies to the foundation part 26.

On erecting the tower of the second wind power plant 20, a further cable 14 for connection to a third wind power plant is also provided. The first cable 14 which is drawn in, need then only be connected.

Figure 3:
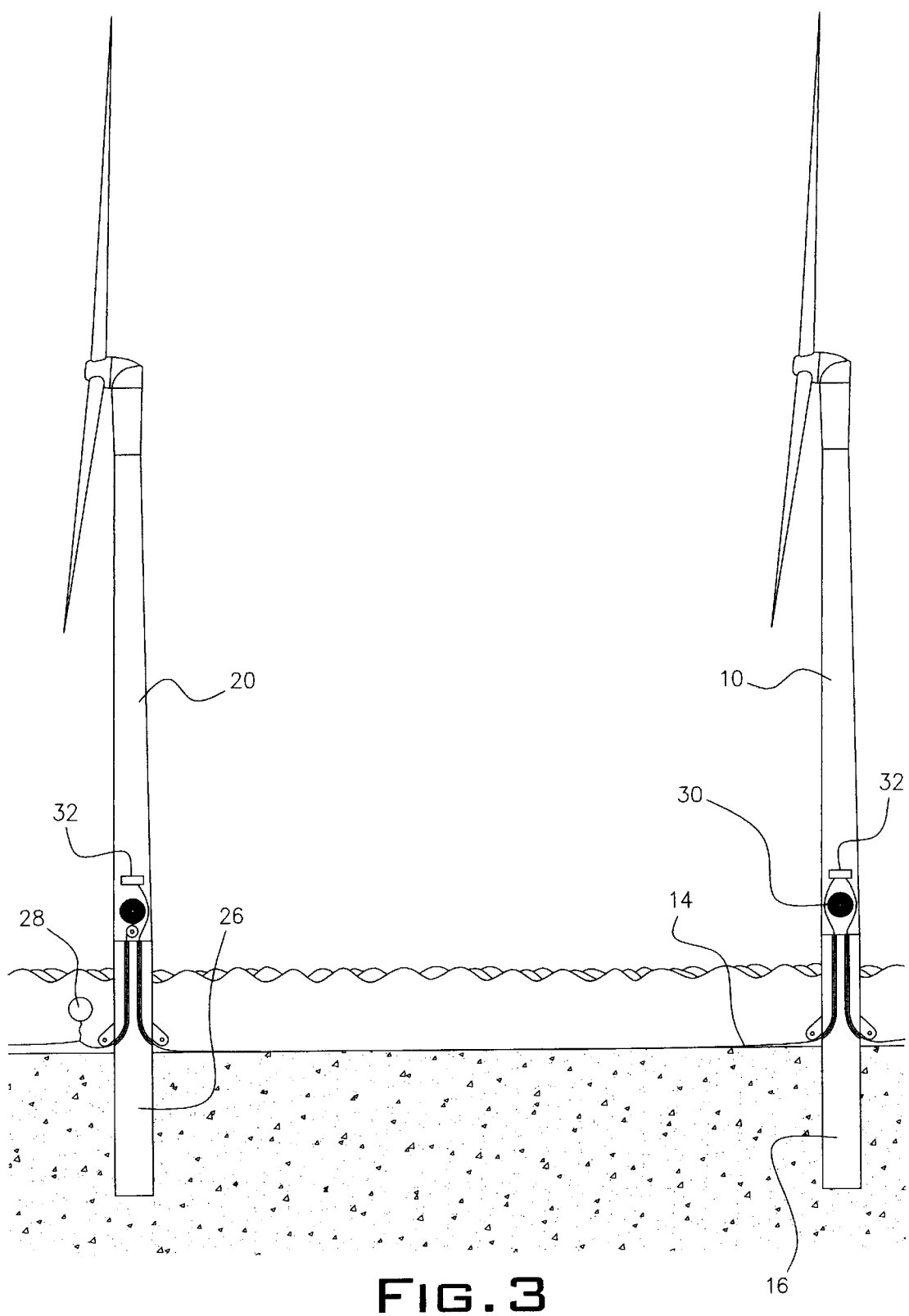
FIG. 3 is a diagrammatic representation of the cable laid between a first and a second wind power plant, a cable again being laid from the second to a third wind power plant.

It is also advantageous to provide guide pulleys 18 in the foundation parts 16, 26, as shown in FIG. 3, and they are advantageously positioned slightly above the ocean floor so as to ensure that, subsequently, the cable has an optimum position. Cable 14 in the towers or foundation parts can be laid either in a meander-shaped manner or wound onto a drum 30. Reference numeral 32 designates the connection point for the electrical connection of the cable 14 in the towers of wind power plants.

Having thus described the invention, what is claimed and desired to be secured by Letters Patent is:

1. A method for laying electric cables from a first offshore wind power plant to a second offshore wind power plant, each of the first and second offshore wind power plants comprising a foundation member embedded into a bed of a body of water such that a top portion thereof extends out into an air surface above the body of water and a tower portion for inserting into the foundation member top portion, the steps of the method comprising:
    a) providing a source of electric cable in the first offshore power plant for laying from the first offshore wind power plant to the second offshore wind power plant prior to inserting the tower portion into the foundation member top portion of the first offshore wind power plant, the source of electric cable having a leading end,
    b) erecting at least each foundation member of the first and second offshore wind power plants,
    c) attaching a tow line to the leading end of the source of electric cable,
    d) transporting the tow line from the first offshore wind power plant to the second offshore wind power plant, and
    e) drawing the leading end of the source of electric cable out from the foundation member of the first offshore wind power plant and into the foundation member of the second offshore wind power plant.

2. The method of claim 1, wherein the source of electric cable is wound onto a drum.

3. The method of claim 1, wherein the source of electric cable is provided within the foundation member of the first offshore wind power plant.

4. The method of claim 1, wherein prior to the step of attaching a tow line to the leading end of the source of electric cable, further comprising the step of inserting the tower portion of the first offshore wind power plant into the foundation member of the first offshore wind power plant.

5. The method of claim 4, wherein the source of electric cable is provided within the tower portion of the first offshore wind power plant.

6. The method of claim 5, wherein the source of electric cable is wound onto a drum.

7. The method of claim 1, wherein the source of electric cable is guided over a guide pulley fitted to the first offshore wind power plant during the step of drawing the leading end of the source of electric cable out from the foundation member of the first offshore wind power plant and into the foundation member of the second offshore wind power plant.

8. The method of claim 7, wherein the guide pulley is disposed along the foundation member of the first offshore wind power plant.

9. The method of claim 7, wherein the guide pulley is disposed along the tower portion of the first offshore wind power plant.

10. The method of claim 1, wherein prior to the step of drawing the source of electric cable leading end out from the foundation member of the first offshore wind power plant and into the foundation member of the second offshore wind power plant, further comprising the step of attaching a float device to the leading edge of the source of electric cable.

11. The method of claim 1, wherein the source of electrical cable is drawn out from the foundation member of the first offshore wind power plant and into the foundation member of the second offshore wind power plant by a winch device located proximal to the second offshore wind power plant.

12. The method of claim 1, further comprising the step of coupling the leading end of the source of electric cable to an electrical cable connection point of the second offshore wind power plant.

13. A method for laying electric cables between a plurality of offshore wind power plants such that all of the offshore wind power plants are electrically coupled to one another in a series, each offshore wind power plant comprising a foundation member embedded into a bed of a body of water such that a top portion thereof extends out into an air surface above the body of water and a tower portion for inserting into the foundation member top portion, the steps of the method comprising:
    a) providing at least one source of electric cable to be laid between a first and second offshore wind power plant, of the plurality thereof, prior to inserting the tower portion into the foundation member top portion of the first offshore wind power plant, the at least one source of electric cable having a leading end,
    b) erecting at least the foundation member of the first and second offshore wind power plants,
    c) attaching a tow line to the leading end of the at least one source of electric cable,
    d) transporting the tow line from the first offshore wind power plant to the second offshore wind power plant,
    e) drawing the leading end of the at least one source of electric cable out from the foundation member of the first offshore wind power and into the foundation member of the second offshore wind power plant; and
    f) electrically coupling the first offshore wind power plant to the second offshore wind power plant by attaching the leading end of the source of the electrical cable to an electrical cable connection point within the second offshore wind power plant.

14. The method of claim 13, wherein the at least one source of electric cable is provided within the foundation member of the first offshore wind power plant.

15. The method of claim 13, wherein the at least one source of electric cable is provided within the tower portion of the first offshore wind power plant.

16. The method of claim 13, wherein the at least one source of electric cable is guided over a guide pulley fitted to the first offshore wind power plant during the step of drawing the leading end of the at least one of source of electric cable out from the foundation member of the first offshore wind power plant and into the foundation member of the second offshore wind power plant.

17. The method of claim 13, wherein the guide pulley is disposed along the foundation member of the first offshore wind power plant.

18. The method of claim 13, wherein the guide pulley is disposed along the tower portion of the first offshore wind power plant.

19. The method of claim 13, wherein prior to the step of drawing the leading end of the at least one source of electric cable out from the foundation member of the first offshore wind power plant and into the foundation member of the second offshore wind power plant, further comprising the step of attaching a float device to the leading end of the at least one source of electric cable.

20. The method of claim 13, wherein the at least one source of electrical cable is drawn out from the foundation member of the first offshore wind power plant and into the foundation member of the second offshore wind power plant by a winch device located proximal to the second offshore wind power plant.

* * * * *